(12) United States Patent
Chae et al.

(10) Patent No.: US 9,164,593 B2
(45) Date of Patent: Oct. 20, 2015

(54) APPARATUS AND METHOD FOR DETECTING AND HANDLING FLEXION STATES OF FLEXIBLE DISPLAY

(71) Applicant: Samsung Electronics Co., Ltd., Gyeonggi-do (KR)

(72) Inventors: Byoung-Duck Chae, Gyeongsangbuk-do (KR); Jong-In Kwak, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 131 days.

(21) Appl. No.: 13/939,480

(22) Filed: Jul. 11, 2013

(65) Prior Publication Data

US 2014/0015745 A1    Jan. 16, 2014

(30) Foreign Application Priority Data

Jul. 13, 2012 (KR) .................. 10-2012-0076480

(51) Int. Cl.
| | |
|---|---|
| *G06F 3/03* | (2006.01) |
| *G06F 3/041* | (2006.01) |
| *G06F 3/0487* | (2013.01) |
| *G06F 3/01* | (2006.01) |
| *G06F 1/16* | (2006.01) |
| *G06F 3/0338* | (2013.01) |

(52) U.S. Cl.
CPC ............... *G06F 3/03* (2013.01); *G06F 1/1652* (2013.01); *G06F 3/017* (2013.01); *G06F 3/0338* (2013.01); *G06F 3/0412* (2013.01); *G06F 3/0414* (2013.01); *G06F 3/0487* (2013.01)

(58) Field of Classification Search
CPC .............................. G06F 1/1652; G06F 3/03
USPC .................................................. 345/156–184
See application file for complete search history.

(56) References Cited

U.S. PATENT DOCUMENTS 7,109,967 B2 *   9/2006   Hioki et al. .................. 345/104
2006/0238494 A1 * 10/2006 Narayanaswami et al. ... 345/156

* cited by examiner

*Primary Examiner* — Kathy Wang-Hurst
*Assistant Examiner* — David Tung
(74) *Attorney, Agent, or Firm* — Cha & Reiter, LLC.

(57) ABSTRACT

Disclosed is a flexion state detecting and handling method and apparatus for detecting and handling a flexion state of a flexible display. A sensing unit includes a bend sensor array having a plurality of bend sensors arranged on the flexible display in a predetermined form. Each of the bend sensors detects a degree of bending as the bend sensor is bent along a flexion of the flexible display at a point where the bend sensor is arranged. A controller generates flexion state information indicating a flexion state of the flexible display based on the degree of bending detected by the bend sensors.

18 Claims, 7 Drawing Sheets

| | X1 | X2 | X3 | X4 | 602 X5 | X6 |
|---|---|---|---|---|---|---|
| Y1 | [2.5V, 2.5V] | [2.5V, 2.5V] | [3.0V, 3.0V] | [3.5V, 3.5V] | [3.0V, 2.5V] | [2.5V, 2.5V] |
| Y2 | [2.5V, 2.5V] | [2.5V, 2.5V] | [2.5V, 2.5V] | [3.0V, 3.0V] | [3.5V, 3.5V] | [3.0V, 3.0V] |
| Y3 | [2.5V, 2.5V] | [2.5V, 2.5V] | [2.5V, 2.5V] | [2.5V, 2.5V] | [3.0V, 3.0V] | [4.0V, 3.5V] |
| Y4 | [2.5V, 2.5V] | [2.5V, 2.5V] | [2.5V, 2.5V] | [2.5V, 2.5V] | [2.5V, 2.5V] | [2.5V, 3.0V] |

APPARATUS AND METHOD FOR DETECTING AND HANDLING FLEXION STATES OF FLEXIBLE DISPLAY

CLAIM OF PRIORITY

This application claims the benefit under 35 U.S.C. §119 (a) of a Korean Patent Application filed in the Korean Intellectual Property Office on Jul. 13, 2012 and assigned Serial No. 10-2012-0076480, the entire disclosure of which is incorporated herein by reference.

BACKGROUND

1. Field of the Invention

The present disclosure relates generally to devices employing a flexible display, and more particularly, to an apparatus and method for detecting and handling flexion states of a flexible display.

2. Description of the Related Art

The term 'flexible display' refers to flexible display devices. Generally, flexible displays are thinner and lighter, and also bendable, warpable, foldable or rollable depending on their flexibility. If a flexible display is employed in an electronic device, a user may fold or roll the flexible display to put it in the electronic device when he or she does not enjoy the content on the flexible display and also makes it possible to enhance miniaturization of electronic devices.

The flexible display may have various flexion states according to user's manipulation, because of its flexibility. For example, the user may bend or fold a part (e.g., a corner or an end) of the flexible display.

Noting that the flexible display may have various forms of flexion states as well as the simple flexion, the present invention provides for the possibility of implementing a variety of functions which may perform specific operations depending on the flexion states of the flexible display. In addition, the present invention provides for the possibility of using various flexion states of the flexible display as a user interface of electronic devices employing the flexible device.

SUMMARY

An aspect of an exemplary embodiment of the present invention is to provide an apparatus and method for detecting and handling flexion states of a flexible display that can be used to implement various functions which may perform specific operations depending on the flexion states of the flexible display.

Another aspect of an exemplary embodiment of the present invention is to provide an apparatus and method for detecting and handling flexion states of a flexible display, making it possible to use the flexion states of the flexible display as a user interface.

In accordance with one aspect of the present invention, there is provided a flexion state detecting and handling apparatus for detecting and handling a flexion state of a flexible display. The apparatus includes a sensing unit including a bend sensor array having a plurality of bend sensors arranged on the flexible display in a predetermined form, wherein each of the bend sensors detects a degree of bending as the bend sensor is bent along a flexion of the flexible display at a point where the bend sensor is arranged; and a controller for generating flexion state information indicating a flexion state of the flexible display based on the degree of bending detected by the bend sensors.

In accordance with another aspect of the present invention, there is provided a flexion state detecting and handling method for detecting and handling a flexion state of a flexible display. The method includes detecting a flexion of the flexible display by bend sensors of a bend sensor array including a plurality of bend sensors, which are arranged on the flexible display in a predetermined form, and each of which detects a degree of bending as the bend sensor is bent along a flexion of the flexible display at a point where the sensor is arranged; and generating flexion state information indicating a flexion state of the flexible display based on the degree of bending detected by the bend sensors.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The terms or words used in this description or appended claims are not limited to their dictionary meanings, but merely used by the inventors, for a clear and consistent understanding of the invention. Therefore, the definitions thereof should be construed based on the contents throughout the specification. In particular, the term 'flexion' as used herein may include not only its original meaning of 'flexion' for a flexible display, but also at least one of the meanings such as 'bending', 'warping', 'folding' and 'rolling', and the term 'flexion state' may include any one or both of 'flexion strength' and 'flexion form'.

Although a rectangular flexible display will be considered in the following description of exemplary embodiments of the present invention by way of example, the exemplary embodiments of the present invention may be applied to other devices having similar technical backgrounds. Embodiments of the present invention may be applied to other devices by those of ordinary skill in the art without departing from the spirit and scope of the invention. In other words, the present invention may be applied in the same way to various other forms of the flexible display other than the rectangular form as long as the devices employ a flexible display.

Figure 1:
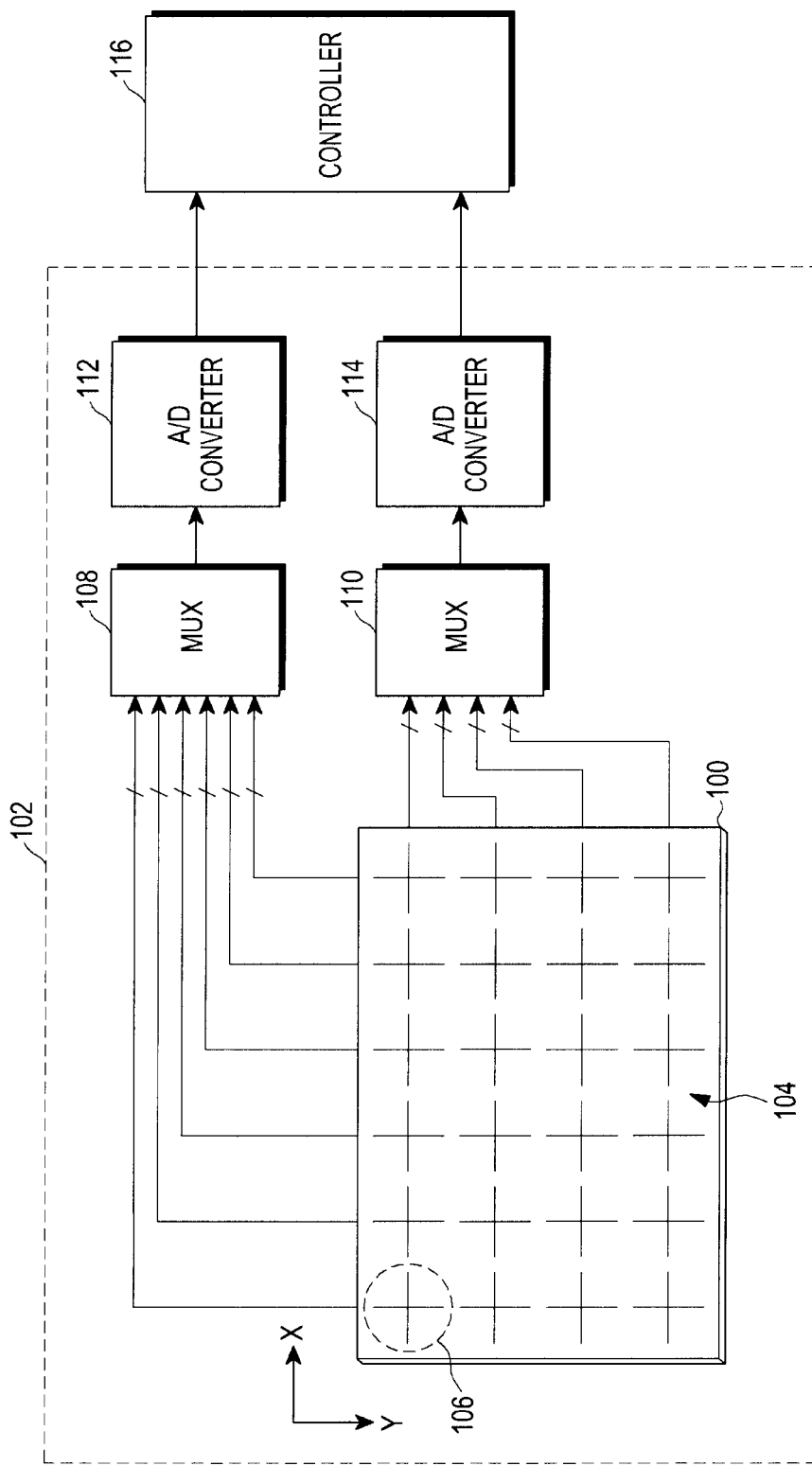
FIG. 1 is a block diagram illustrating an exemplary configuration of an apparatus for detecting and handling flexion states of a flexible display according to an embodiment of the present invention.

FIG. 1 illustrates an exemplary configuration of an apparatus for detecting and handling flexion states of a flexible display according to an embodiment of the present invention. Referring to FIG. 1, the flexion state detecting and handling apparatus includes a sensing unit 102 and a controller 116.

The sensing unit 102 includes a bend sensor array 104, multiplexers (MUXs) 108 and 110, and Analog-to-Digital (A/D) converts 112 and 114. Reference numeral 100 represents a flexible display. Although it appears in FIG. 1 that the flexible display 100 is included in the sensing unit 102, it is merely to show the arrangement of the bend sensor array 104, and it should be noted that the flexible display 100 is not included within the sensing unit 102.

The bend sensor array 104 includes a plurality of bend sensors which are arranged on the flexible display 100 in a predetermined form. FIG. 1 shows an exemplary structure of the bend sensor array 104 in which 24 bend sensor sets each including two bend sensors are arranged on the flexible display 100 in the form of a grid. To avoid the complexity, in FIG. 1, only one bend sensor set among the 24 bend sensor sets is numbered reference numeral 106 as a representative. Two bend sensors of each bend sensor set are arranged in different directions such that their centers cross each other. FIG. 1 shows an example in which among the two bend sensors of each bend sensor set, one is arranged in the horizontal axis (or X-axis direction) of the flexible display 100, while the other one is arranged in the vertical direction (or Y-axis direction) of the flexible display 100.

Figure 2:
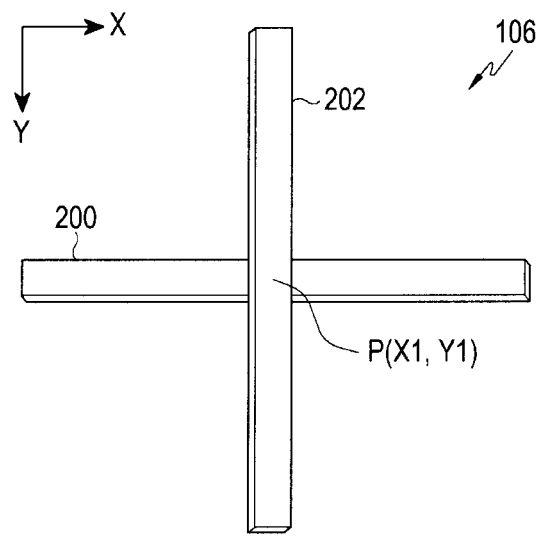
FIG. 2 is a block diagram illustrating an exemplary configuration of a bend sensor set according to an embodiment of the present invention.

FIG. 2 illustrates a configuration of an example of a bend sensor set according to an embodiment of the present invention. Specifically, FIG. 2 shows a configuration of a bend sensor set 106, one of the bend sensor sets of the bend sensor array 104 in FIG. 1. The bend sensor sets of the bend sensor array 104 are all configured in a similar fashion as shown in FIG. 2. Referring to FIG. 2, a bend sensor 200 is arranged in the X-axis direction while a bend sensor 202 is arranged in the Y-direction, and the centers of the bend sensors 200 and 202 cross each other, forming a shape of a "+". Since the bend sensor set 106 is arranged in the first position both in the X-axis direction and the Y-axis direction, a position P of the bend sensor set 106 is specified by coordinates of (X1,Y1). In this way, the positions of the bend sensor sets of the bend sensor array 104 may be specified by coordinates in the form of (X,Y) in order of their arrangement in the X-axis direction and the Y-axis direction.

As shown in FIG. 2, flexible bend sensors in the form of a thin strip may be used as the bend sensors 200 and 202. At present, various kinds of flexible bend sensors are available. For example, flexible bend sensors, whose resistance varies depending on their degree of bending, may be used as the bend sensors 200 and 202. An example of these flexible bend sensors is shown in FIG. 3.

Figure 3:
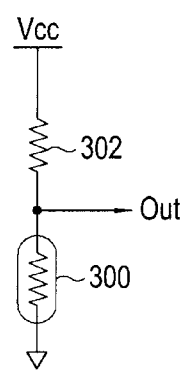
FIG. 3 is a circuit diagram illustrating an example of a general flexible bend sensor according to an embodiment of the present invention.

FIG. 3 illustrates an exemplary circuit diagram of a general flexible bend sensor of an embodiment of the present invention. Referring to FIG. 3, a resistor 302 and a flexible bend sensor 300 are cascade-connected between the supply voltage Vcc and ground. A detected signal Out is an output from a junction between the resistor 302 and the flexible bend sensor 300. Since the flexible bend sensor 300 varies in resistance depending on the degree of bending thereof, a voltage of the detected signal Out also varies in level depending on the degree of bending. Therefore, it is possible to measure the degree of bending by measuring the voltage of the detected signal Out.

Referring again to FIG. 2, the bend sensors 200 and 202 are also configured to have the circuit of FIG. 3. For simplicity, the circuit of FIG. 3 is not shown in FIGS. 1 and 2. The bend sensors 200 and 202 are attached onto the backside (e.g., a side on which images are not displayed) of the flexible display 100. If the bend sensors 200 and 202 are transparent and do not prevent images from being displayed on the front side of the flexible display 100, the bend sensors 200 and 202 may be attached onto the front side of the flexible display 100. The flexible display 100 may be manufactured to include the bend sensors 200 and 202 as its components.

Accordingly, the bend sensors 200 and 202 may detect their degree of bending as they are bent along a flexion of the flexible display 100, thereby outputting a detected signal whose level corresponds to the degree of bending.

Referring back to FIG. 1, detected signals output from the bend sensors of the bend sensor array 104 are applied to their associated MUXs 108 and 110. The MUX 108 multiplexes detected signals output from the bend sensors arranged in the Y-axis direction among the bend sensors of the bend sensor array 104, i.e., from the bend sensors arranged like the bend sensor 202 of FIG. 2, and applies the multiplexed detected signals to the A/D converter 112. The MUX 110 multiplexes detected signals output from the bend sensors arranged in the X-axis direction among the bend sensors of the bend sensor array 104, i.e., from the bend sensors arranged like the bend sensor 200 of FIG. 2, and applies the multiplexed detected signals to the A/D converter 114. The A/D converters 112 and 114 convert levels (i.e., voltage levels) of the detected signals multiplexed by their associated MUXs into corresponding digital detected values, and provide the digital detected values to the controller 116.

Although it is assumed in FIG. 1 that the MUXs 108 and 110 are connected between the bend sensor array 104 and the A/D converts 112 and 114, the detected signals from the bend sensor array 104 may be multiplexed by the MUXs 108 and 110 after undergoing A/D conversion. In this case, however, the A/D converters should be the same in number as the bend sensors, because the non-multiplexed detected signals from the bend sensor array 104 should undergo A/D conversion individually. On the other hand, the A/D converts 112 and 114 may be omitted, if a processor having an A/D conversion function is used as the controller 116.

The controller 116 receives the detected signals A/D-converted by the A/D converters 112 and 114, and generates flexion state information indicating a flexion state of the flexible display 100 based on the degrees of bending detected by the bend sensors of the sensing unit 102. The controller 116 may be a main control processor of the device to which the present invention is applied. The controller 116 may be implemented by allowing the processor of the device, to which the present invention is applied, to detect and handle flexion states according to an embodiment of the present invention. In contrast, the controller 116 may be implemented by dedicated hardware or firmware to detect and handle flexion states according to an embodiment of the present invention.

Figure 4:
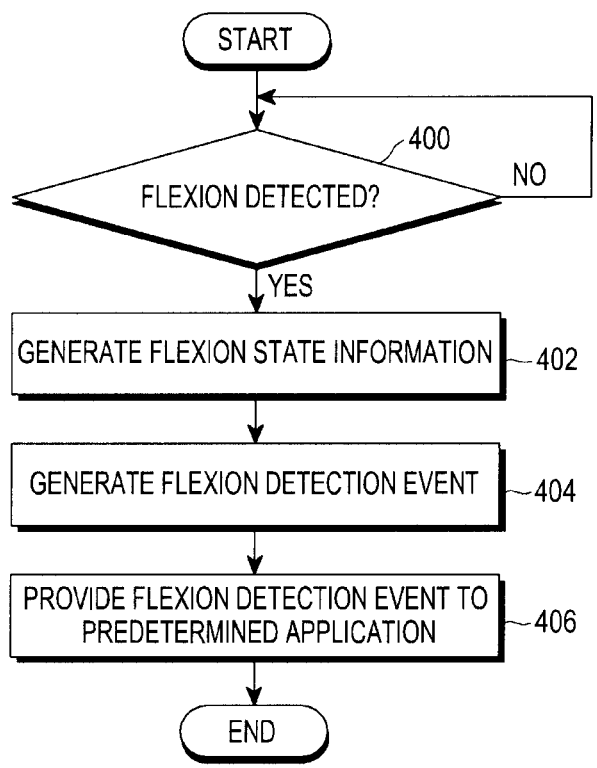
FIG. 4 is a flowchart illustrating an example of detecting and handling flexion states of a flexible display according to an embodiment of the present invention.

FIG. 4 illustrates an example of a flowchart of detecting and handling flexion states of a flexible display according to an embodiment of the present invention. The functions of the flowchart of FIG. 4 are performed by the controller 116. Referring to FIG. 4, the controller 116 determines in step 400 whether a flexion of the flexible display 100 is detected by the bend sensors of the bend sensor array 104, and proceeds to step 402 upon detecting the flexion. The controller 116 may recognize the detection of a flexion, if a predetermined number or more of detected values among the detected values received from the A/D converters 112 and 114 in the sensing unit 102 exceed a reference value by predetermined value or more.

Although a voltage of the detected signals output from the bend sensors may vary depending on the characteristics and circuit structure of the bend sensors in use, it will be assumed herein that when the bend sensors have no flexion, a voltage of their detected signals is 2.5V, and when the bend sensors have a flexion, a voltage of their detected signals varies within a range of 0.5V below 2.5V and over 2.5V~4.5V depending on their degrees of bending. In this case, the reference value is set as 2.5V. Considering possible errors, the controller 116 may be set in advance to recognize the detection of a flexion, if a voltage of the detected signals deviates from a range of, for example, 2.4V~2.6V. In addition, the controller 116 may be set in advance to recognize the detection of a flexion, if a voltage of a predetermined number or more of (for example, two or more) detected signals deviates from a range of 2.4V~2.6V.

The range of 0.5V~below 2.5V corresponds, for example, to a case where a flexion of the bend sensors occurs toward the rear of the flexible display 100, while the range of over 2.5V~4.5V corresponds, for example, to a case where a flexion of the bend sensors occurs toward the front of the flexible display 100. It will be assumed herein that when the degrees of bending are represented in bending angles according to an embodiment of the present invention, bending angles corresponding to voltages of detected signals, which are based on the degrees of bending, are set in advance to correspond to Table 1 below.

TABLE 1

| Angle [°] | | | | | | | | |
|---|---|---|---|---|---|---|---|---|
| | 180 | 135 | 90 | 45 | 0 | −45 | −90 | −135 | −180 |
| Voltage [V] | 4.5 | 4.0 | 3.5 | 3.0 | 2.5 | 2.0 | 1.5 | 1.0 | 0.5 |

In Table 1, negative angles are bending angles for a case where a flexion of the bend sensors are inclined toward the rear of the flexible display 100, while positive angles are bending angles for a case where a flexion of the bend sensors are inclined toward the front of the flexible display 100. It will be apparent to those of ordinary skill in the art that a voltage of the detected signals may continuously vary depending on the change in degree of bending, instead of discontinuously varying depending on the degrees of bending as shown in Table 1. However, for convenience, it will be assumed herein that a voltage of the detected signals is set as one of the voltages shown in Table 1. In actual implementation, steps of voltages of the detected signals and their corresponding bending angles may be subdivided, and a flexion of the bend sensors may be represented by a voltage of the detected signals in adjacent steps and a bending angle corresponding to the voltage of an incremental step.

In step 402, the controller 116 generates flexion state information indicating a flexion state of the flexible display 100 based on the degrees of bending detected by the bend sensors of the bend sensor array 104. In an embodiment of the present invention, the flexion state information generated by the controller 116 may be divided into two different types. A first type of the flexion state information consists of a bending angle array. A second type of the flexion state information consists of standardized information.

Figure 5A:
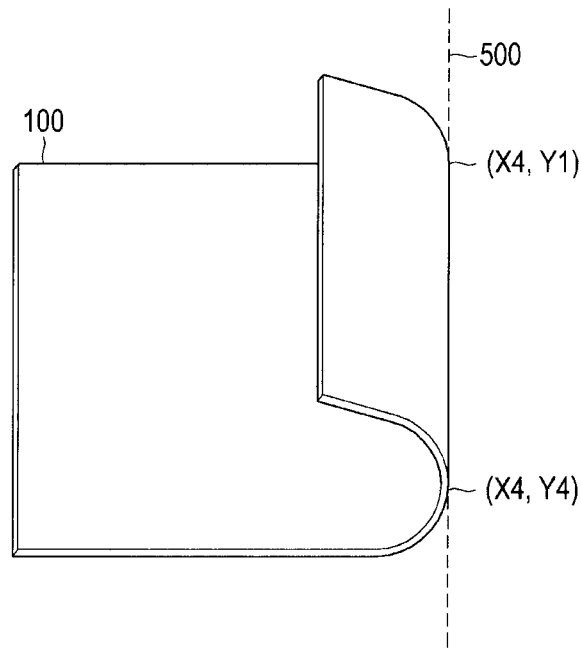
FIG. 5A is a perspective view illustrating an example of a flexion state of a flexible display according to an embodiment of the present invention.
Figure 5B:
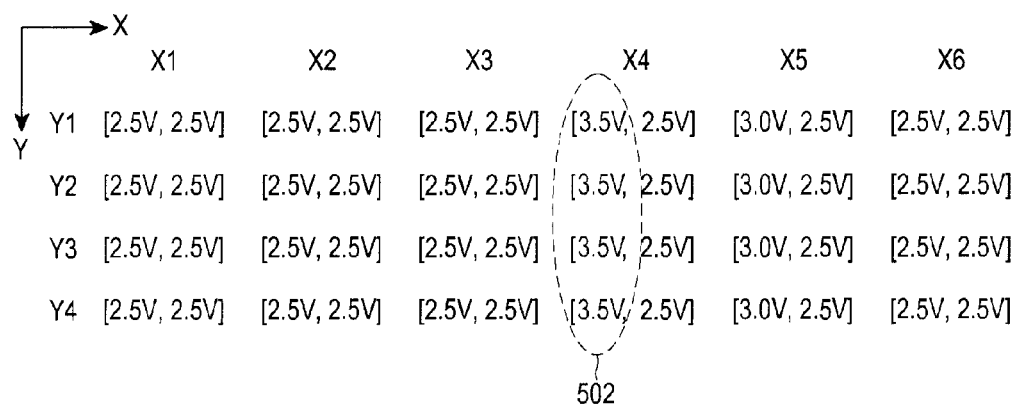
FIG. 5B is a chart illustrating an example of detected values for the flexion state shown in FIG. 5A.
Figure 5C:
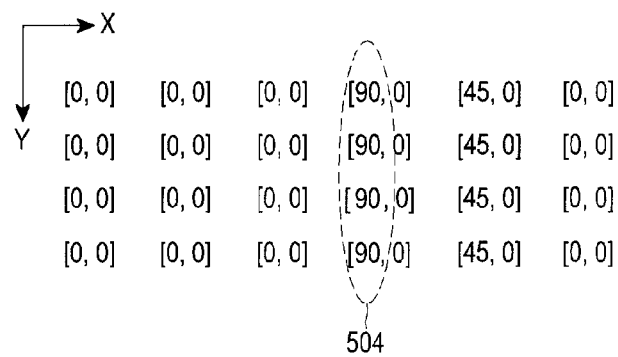
FIG. 5C is a chart illustrating an example of a bending angle array based on the detected values shown in FIG. 5B.

FIG. 5A illustrates an example of a flexion state of a flexible display according to an embodiment of the present invention. FIG. 5B illustrates examples of detected values for the flexion state shown in FIG. 5A. FIG. 5C illustrates an example of a bending angle array based on the detected values shown in FIG. 5B. The operation of the controller 116 generating the flexion state information will be described below with reference to FIGS. 5A to 5C.

Specifically, FIG. 5A is a perspective view illustrating an example of a flexion state in which a part of the flexible display 100 is bent along a bending centerline 500 in the Y-axis direction. If bend sensors corresponding to the bending centerline 500 formed by a flexion of the flexible display 100 are assumed to include a bend sensor with coordinates of (X4, Y1), a bend sensor with coordinates of (X4, Y4), and bend sensors arranged between these bend sensors as shown in FIG. 5A, their detected values may be shown in the form of an array as shown in FIG. 5B. The bend sensors corresponding to the bending centerline 500 mean bend sensors located on the bending centerline 500 among the bend sensors located in a bending area of the flexible display 100.

FIG. 5B is a chart illustrating an example in which detected values by the bend sensors arranged in unbent positions are 2.5V, while detected values by the bend sensors arranged in bent positions are 3.0V or 3.5V depending on their degree of bending. In FIG. 5B, reference numeral 502 represents detected values by the bend sensors corresponding to the bending centerline 500 in FIG. 5A, i.e., the bend sensors located in coordinates of (X4, Y1), (X4, Y2), (X4, Y3), and (X4, Y4). Even though bend sensors located in coordinates of (X5, Y1), (X5, Y2), (X5, Y3), and (X5, Y4) are placed out of the bending centerline 500, they are located in the bending area, so detected values by these bend sensors are also different from the reference value.

The controller 116 converts the degrees of bending (i.e., detected values) detected by the bend sensors of the bend sensor array 104 into corresponding bending angles as shown in Table 1. The controller 116 generates, as flexion state information, a bending angle array in which the converted bending angles are arranged to correspond to the bend sensor array 104. In other words, the controller 116 generates flexion state information including a bending angle array from the detected values shown in FIG. 5B, as illustrated in the example shown in FIG. 5C. In FIG. 5C, reference numeral 504 represents bending angles corresponding to the detected values 502 of the bend sensors corresponding to the bending centerline 500.

The controller 116 may generate, as flexion state information, standardized information instead of the bending angle array. The standardized information is generated based on the bending angle array, and configured in the form of [Xa, Ya, Xb, Yb, Deg], where (Xa, Ya) and (Xb, Yb) are coordinates of bend sensors arranged on both ends of a bending centerline among bend sensors corresponding to the bending centerline, and Deg is a bending angle. For example, for the bending angle array shown in FIG. 5C, the standardized information may be [X4, Y1, X4, Y4, 90].

Figures 6A, 6B:
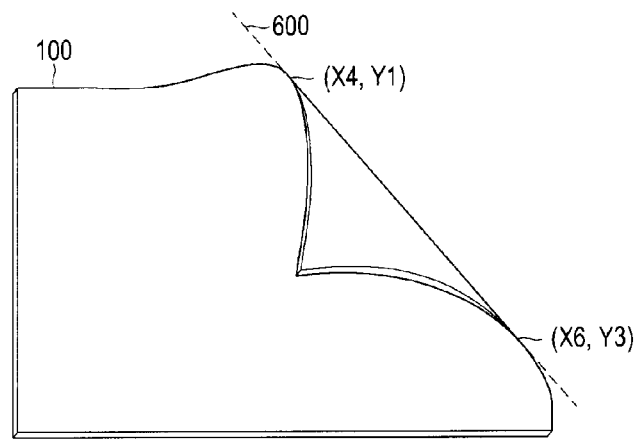
FIG. 6A is a perspective view illustrating another example of a flexion state of a flexible display according to an embodiment of the present invention.
FIG. 6B is a chart illustrating an example of detected values for the flexion state shown in FIG. 6A.
Figure 6C:
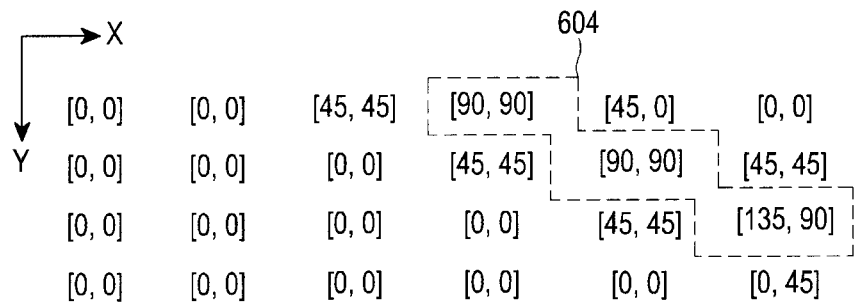
FIG. 6C is a chart illustrating an example of a bending angle array based on the detected values shown in FIG. 6B.

FIG. 6A is a perspective view illustrating another example of a flexion state of a flexible display according to an embodiment of the present invention. FIG. 6B illustrates detected values for the flexion state shown in FIG. 6A. FIG. 6C illustrates a bending angle array based on the detected values shown in FIG. 6B. How the controller 116 generates the flexion state information will be described below with reference to FIGS. 6A to 6C.

Specifically, FIG. 6A shows an example of a flexion state in which the upper-right corner of the flexible display 100 is bent along a bending centerline 600. If bend sensors corresponding to the bending centerline 600 formed by a flexion of the flexible display 100 are assumed to include a bend sensor with coordinates of (X4, Y1), a bend sensor with coordinates of (X6, Y3), and bend sensors arranged between these bend sensors as shown in FIG. 6A, their detected values may be shown in the form of an array as shown in FIG. 6B. The bend sensors corresponding to the bending centerline 600 mean bend sensors located on the bending centerline 600 among the bend sensors located in a bending area of the flexible display 100.

FIG. 6B is a chart illustrating an example in which detected values by the bend sensors arranged in unbent positions are 2.5V, while detected values by the bend sensors arranged in bent positions are 3.0V, 3.5V or 4.0V depending on their degree of bending. In FIG. 6B, reference numeral 602 represents detected values by the bend sensors corresponding to the bending centerline 600 in FIG. 6A, i.e., the bend sensors located in coordinates of (X4, Y1), (X5, Y2), and (X6, Y3). Detected values by the bend sensors, which are placed out of the bending centerline 600 but located in the bending area, are also different from the reference value as shown in FIG. 6B.

The controller 116 converts the degree of bending (i.e., detected values) detected by the bend sensors of the bend sensor array 104 into corresponding bending angles as shown in Table 1. The controller 116 generates, as flexion state information, a bending angle array in which the converted bending angles are arranged to correspond to the bend sensor array 104. In other words, the controller 116 generates flexion state information including a bending angle array from the detected values shown in FIG. 6B, as illustrated in the example shown in FIG. 6C. In FIG. 6C, reference numeral 604 represents bending angles corresponding to the detected values 602 of the bend sensors corresponding to the bending centerline 600.

The controller 116 may generate, as flexion state information, standardized information in the form of [Xa, Ya, Xb, Yb, Deg] instead of the bending angle array. Unlike in the example of FIG. 5C, the bending angles 604 may not be all the same as in FIG. 6C. Therefore, in actual implementation, as the bending angle Deg in the standardized information, the maximum angle or the most frequent angle among the bending angles 604 may be selected, or an average value of the bending angles 604 may be determined by designer. For example, if the maximum angle among the bending angles 604 is selected, the standardized information may be [X4, Y1, X6, Y3, 135], for the bending angle array in FIG. 6C [What is the criteria for selecting the angle?].

Various other flexion states of a flexible display may be available in addition to the examples shown in FIGS. 5A and 6A. The flexion states of the flexible display 100, shown in FIGS. 5A and 6A, are mere examples given for a better understanding of the invention, and they may vary depending on the flexibility of the flexible display 100 and the user's manipulation. It will be apparent to those of ordinary skill in the art that even for the other flexion states except those in FIGS. 5A and 6A, the flexion state information may be generated in the same manner.

The detected values shown in FIGS. 5B and 6B, and the bending angles shown in FIGS. 5C and 6C are also mere examples given for a better understanding of the invention, and they may vary depending on the flexibility of the flexible display 100 and the length of the bend sensors.

Referring back to FIG. 4, after generating the flexion state information in step 402, the controller 116 generates a flexion detection event in step 404. The flexion detection event is an event of informing a predetermined application of the detection of a flexion and providing flexion state information. The flexion detection event may be in the form of, for example, "FLEXION EVENT+[Xa, Ya, Xb, Yb, Deg]", or "FLEXION EVENT+FLEXION ANGLE ARRAY". In other words, the flexion detection event includes "FLEXION EVENT" indicating that the event type is flexion detection, and also includes standardized information or a flexion angle array as flexion state information. The predetermined application is an application that performs a predetermined operation depending on the flexion state information upon detecting the flexion of the flexible display 100. In step 406, the controller 116 provides the generated flexion detection event to the predetermined application.

The flexion state information according to the present invention does not merely indicate whether the flexible display 100 is bent, but also indicates the degree of bending and the bending form. For example, referring to FIG. 5C, the bending angles 90° corresponding to the bending centerline 500 indicate the degree of bending, and the coordinates [X4, Y1], [X4, Y2], [X4, Y3], and [X4, Y4] indicate the bending form shown in FIG. 5A. The standardized information [X4, Y1, X4, Y4, 90] based on the bending angle array of FIG. 5C also indicates the degree of bending and the bending form. These are the same to the example shown in FIGS. 6A to 6C, as well.

Therefore, an application, which has received the flexion state information, may identify not only the degree of bending but also the bending form of the detected flexion. Application developers may develop applications such that an application, which has received the flexion state information, may perform an operation that is set in advance to correspond to any one or both of the degree of bending and the bending form based on the flexion state information.

For example, the flexion states of the flexible display 100 may be used as a user interface. Devices employing a flexible display may be controlled based on the flexion states of the flexible display. Devices employing a flexible display may perform a variety of operations. For example, a device, to which the present invention is applied, may change the zoom magnification of a camera depending on the bending angle, or may zoom in/out images of web pages or pictures depending on the bending angle. Also, an e-Book reader, to which the present invention is applied, may turn over the pages depending on the bending angle and/or the bending form, or may add a bookmark if the end of the page (to be specific, the end of the flexible display) is folded by the user.

As described above, the present invention may detect degrees of bending in a plurality of positions on the flexible display to generate flexion state information indicating the degrees of bending and the bending forms. Accordingly, the present invention may be used to implement a variety of functions that perform specific operations depending on the flexion states of the flexible display. In addition, devices employing a flexible display may use flexion states of the flexible display as a user interface.

Though the bending angle array is greater than the standardized information in terms of the amount of information, applications that utilize the flexion state information may more precisely recognize the degree of bending and the bending form compared to the standardized information. Since the standardized information is less than the bending angle array in terms of the amount of information, applications that utilize the flexion state information may quickly and easily recognize the degree of bending and the bending form compared to the bending angle array. Therefore, application developers may implement applications as needed, so as to allow the applications to determine which of the bending angle array and the standardized information they will utilize as flexion state information.

Figure 7:
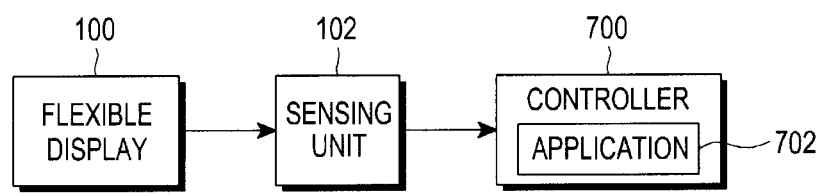
FIG. 7 is a block diagram illustrating an exemplary configuration of an apparatus for detecting and handling flexion states of a flexible display according to another embodiment of the present invention.

FIG. 7 illustrates an exemplary configuration of an apparatus for detecting and handling flexion states of a flexible display according to another embodiment of the present invention. Referring to FIG. 7, the flexion state detecting and handling apparatus includes a sensing unit 102 and a controller 700.

The sensing unit 102, which is the sensing unit 102 in FIG. 1, includes the bend sensor array 104 as described above to detect the degree of bending of the flexible display 100.

The controller 700 includes an application(s) 702. The application 702, which is an application that utilizes the flexion state information as described above, may be installed to be executed by the controller 700. The application 702 performs predetermined operations in response to a flexion detection event. In other words, by executing the application 702, the controller 700 may perform predetermined operations to correspond to any one or both of the degree of bending and the bending forms based on the flexion state information in response to the flexion state event. Examples of the predetermined operations being perform have been mentioned above.

Figure 8A:
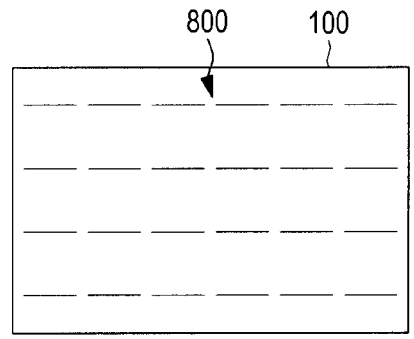
FIGS. 8A, 8B, 8C and 8D are block diagrams illustrating exemplary bend sensor arrays according to different embodiments of the present invention.

FIGS. 8A to 8D illustrate examples of bend sensor arrays according to different embodiments of the present invention. Referring to FIG. 8A, a bend sensor array 800 disposed on the flexible display 100 includes a plurality of bend sensors arranged in the form of a grid. The bend sensors of the bend sensor array 800 are arranged only in the horizontal direction of the flexible display 100.

Figure 8B:
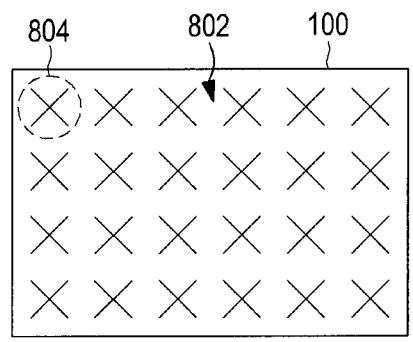

Referring to FIG. 8B, a bend sensor array 802 disposed on the flexible display 100 includes a plurality of bend sensor sets arranged in the form of a grid. In FIG. 8B, only one bend sensor set among the 24 bend sensor sets is numbered as reference numeral 804 as a representative. As shown in the bend sensor set 804, two bend sensors of each bend sensor set are arranged such that their centers may cross each other in the form of "X".

Figure 8C:
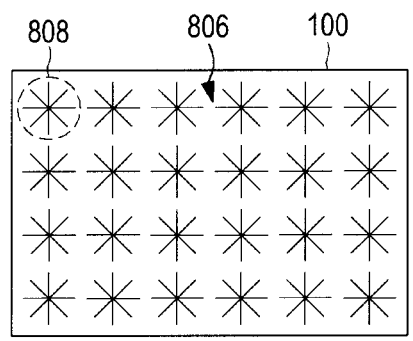

Referring to FIG. 8C, a bend sensor array 806 disposed on the flexible display 100 includes a plurality of bend sensor sets arranged in the form of a grid. In FIG. 8B, only one bend sensor set among the 24 bend sensor sets is numbered reference numeral 808 as a representative. As shown in the bend sensor set 808, four bend sensors of each bend sensor set are arranged such that their centers may cross each other in the form shown in FIG. 8C.

Figure 8D:
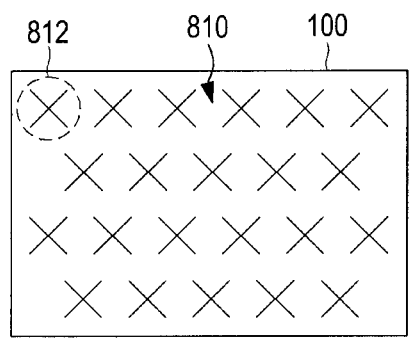

Referring to FIG. 8D, a bend sensor array 810 disposed on the flexible display 100 includes a plurality of bend sensor sets arranged in the form of a grid. In FIG. 8D, only one bend sensor set among the 22 bend sensor sets is numbered as reference numeral 812 as a representative. As shown in the drawing, the bend sensor set 812 is the same in form as the bend sensor set 804 in FIG. 8B, but unlike in FIG. 8B, the bend sensor sets in FIG. 8D are arranged such that their columns alternate with adjacent columns.

Referring to FIGS. 8A to 8D, it may be noted that the bend sensors of the bend sensor array 104 in FIG. 1 may be arranged in various forms other than the form shown in FIG. 1. In addition, it will be noted that the bend sensors or the bend sensor sets may be arranged only in a single line on the flexible display 100 in the horizontal direction or the vertical direction, and the number of bend sensors of each bend sensor set may increase. As the number of bend sensors increases, the degrees of bending and the bending forms may be represented more precisely, but the complexity of implementation or the handling difficulty may increase.

Therefore, the forms of the bend sensor array, the number of bend sensors, and the length of the bend sensors may be selected based on the size or the flexibility of the flexible display 100, the manufacturing technology needed for implementation of the sensing unit 102, and the precision of the degrees of bending and the bending forms required by the application(s) that utilizes the flexion state information.

It can be seen that the embodiments of the present invention can be implemented with hardware, software, or a combination of hardware and software. Such arbitrary software may be stored, whether or not erasable or re-recordable, in a volatile or non-volatile storage such as a Read-Only Memory (ROM) or a Random Access Memory (RAM); and an optically or magnetically recordable and machine (e.g., computer)-readable storage medium such as a Compact Disc (CD), a Digital Versatile Disk (DVD), a magnetic disk, or a magnetic tape. Therefore, the present invention includes a program including codes for implementing a device or method claimed in an arbitrary claim and a machine-readable storage medium for storing such a program. The program may be electronically transferred through an arbitrary medium such as a communication signal delivered through wired or wireless connection, and the present invention properly includes equivalents thereof.

If the flexion state detecting and handling method and apparatus provided by an embodiment of the present invention are applied to a mobile device, the mobile device may download a program (e.g., application) for detecting and handling flexion states, from a remote program provision device (e.g., server), or install the program or application therein, and use it to detect and handle the flexion states. In other words, if a program for detecting and handling flexion states is installed in a mobile device, the program may detect and handle the flexion states by being execute in the mobile device. The program provision device transmits the program to the mobile device automatically or in response to a transmission request for the program from the mobile device. The program provision device may determine whether the mobile device has subscribed to the service, perform user authentication, and check payment information. The program provision device may include a communication unit for performing wired/wireless communication with the mobile device, a storage medium storing the program, and a controller for transmitting the program to the mobile device by means of the communication unit. The storage medium may be positioned inside or outside the program provision device.

The above-described methods according to the present invention can be implemented in hardware, firmware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for detecting a state of a flexible display, comprising:
    a sensing unit including a bend sensor array, the bend sensor array including a plurality of bend sensors arranged on the flexible display in a first arrangement; and
    a controller configured to generate state information indicating a degree of bending and shape of the flexible display, the state information including a bending angle array, wherein the bending angle array includes a plurality of bending angles, each of the bending angles is detected based on a signal received from a different one of the bend sensors that indicates a degree of bending of that bend sensor, the bending angles are arranged in the bending angle array in a second arrangement that corresponds to the first arrangement, and a count of bending angles in the bending angle array is equal to a count of bend sensors in the plurality of bend sensors.

2. The apparatus of claim 1, wherein the first arrangement and the second arrangement are the same.

3. The apparatus of claim 1, wherein the controller is further configured to generate a flexion detection event and provide the state information to a predetermined application in response to detecting that the flexible display is bent.

4. The apparatus of claim 3, wherein the controller is further configured to execute the application to perform an operation based on at least one of the degree of bending and shape of the flexible display.

5. The apparatus of claim 1, wherein the bend sensors are arranged in at least one line in a horizontal or vertical direction of the flexible display.

6. The apparatus of claim 1, wherein the bend sensor array includes a plurality of bend sensor sets which are arranged in at least one line in a horizontal or vertical direction of the flexible display;
    wherein each of the bend sensor sets includes at least two bend sensors; and
    wherein the bend sensors of each bend sensor set are arranged in different directions, and arranged such that centers thereof cross each other.

7. The apparatus of claim 1, wherein the bend sensor array includes a plurality of bend sensor sets which are arranged on the flexible display in a form of a grid;
    wherein each of the bend sensor sets includes at least two bend sensors; and
    wherein the bend sensors of each bend sensor set are arranged in different directions, and arranged such that centers thereof cross each other.

8. The apparatus of claim 7, wherein the sensing unit includes:
    a plurality of multiplexers for multiplexing detected signals output from the bend sensors arranged in different directions; and
    a plurality of analog-to-digital (A/D) converters for converting levels of the detected signals multiplexed by corresponding multiplexers into corresponding digital detected values, and providing the digital detected values to the controller.

9. The apparatus of claim 7, wherein each of the bend sensor sets includes a first bend sensor and a second bend sensor in a form of a strip;
    wherein the first bend sensor is arranged in a horizontal direction of the flexible display, and the second bend sensor is arranged in a vertical direction of the flexible display; and
    wherein the first and second bend sensors are arranged in a form of a plus sign.

10. An apparatus for detecting a state of a flexible display, comprising:
    a sensing unit including a bend sensor array, the bend sensor array including a plurality of bend sensors arranged on the flexible display in a first arrangement; and
    a controller configured to generate state information indicating a degree of bending and shape of the flexible display based on a bending angle array, wherein the bending angle array includes a plurality of bending angles, each of the bending angles is detected based on a signal received from a different one of the bend sensors that indicates a degree of bending of that bend sensor, the bending angles are arranged in the bending angle array in a second arrangement that corresponds to the first arrangement, a count of bending angles in the bending angle array is equal to a count of bend sensors in the plurality of bend sensors, and the state information includes coordinates and a representative bending angle of bend sensors from the bend sensor array that are arranged on both ends of a bend line.

11. A method for detecting a state of a flexible display, comprising:
    detecting that the flexible display is bent by using a bend sensor array including a plurality of bend sensors arranged on the flexible display in a first arrangement; and
    generating state information indicating a degree of bending and shape of the flexible display, the state information including a bending angle array, wherein the bending angle array includes a plurality of bending angles, each of the bending angles is detected based on a signal received from a different one of the bend sensors that indicates a degree of bending of that bend sensor, the bending angles are arranged in the bending angle array in a second arrangement that corresponds to the first arrangement, and a count of bending angles in the bending angle array is equal to a count of bend sensors in the plurality of bend sensors.

12. The method of claim 11, wherein the first arrangement and the second arrangement are the same.

13. The method of claim 11, further comprising generating a flexion detection event and providing the state information to a predetermined application in response to detecting that the flexible display is bent.

14. The method of claim 13, further comprising executing the application in response to the flexion detection event, to perform an operation based on at least one of the degree of bending and the shape of the flexible display.

15. The method of claim 13, further comprising executing the application in response to the flexion detection event, to perform an operation based on both of the degree of bending and shape of the flexible display.

16. A method for detecting a state of a flexible display, comprising:
    detecting that the flexible display is bent by using a bend sensor array including a plurality of bend sensors arranged on the flexible display in a first arrangement; and
    generating state information indicating a degree of bending and shape of the flexible display of the flexible display based on a bending angle array, wherein the bending angle array includes a plurality of bending angles, each of the bending angles is detected based on a signal received from a different one of the bend sensors that indicates a degree of bending of that bend sensor, the bending angles are arranged in the bending angle array in a second arrangement that corresponds to the first arrangement, a count of bending angles in the bending angle array is equal to a count of bend sensors in the plurality of bend sensors, and the state information includes coordinates and a representative bending angle of bend sensors from the bend sensor array that are arranged on both ends of a bend line.

17. The method of claim 16, wherein each of the bend sensors arranged on both ends of the bend line is associated with a respective bending angle, and the representative bending angle includes a maximum value of the respective bending angles of the bend sensors arranged on both ends of the bend line.

18. The method of claim 16, wherein each of the bend sensors arranged on both ends of the bend line is associated with a respective bending angle, and the representative bending angle includes an average value of the respective bending angles of the bend sensors arranged on both ends of the bend line.

* * * * *